P. HANNAY.
SPECTACLES.

No. 176,625. Patented April 25, 1876.

Witnesses:
a. McCallum
K. G. Stuart

Inventor.
P. Hannay.

UNITED STATES PATENT OFFICE.

PETER HANNAY, OF WASHINGTON, DISTRICT OF COLUMBIA.

IMPROVEMENT IN SPECTACLES.

Specification forming part of Letters Patent No. 176,625, dated April 25, 1876; application filed March 24, 1876.

*To all whom it may concern:*

Be it known that I, PETER HANNAY, of Washington, in the county of Washington, in the District of Columbia, have invented certain new and useful Improvements in Spectacles and Eyeglasses; and I do hereby declare that the following is a full, clear, and exact description thereof, which will enable others skilled in the art to which it appertains to make and use the same, reference being had to the accompanying drawings, and to letters of reference marked thereon, which form a part of this specification.

People compelled to use glasses for the purpose of improving their vision experience difficulty in seeing with distinctness objects through them at a greater focal range. This difficulty is greatly increased in the endeavor to see through them either in looking upward or downward, but more especially the latter, as the great refraction thereby induced seems to raise the floor upward toward them, and which has been the fruitful source of many severe as well as fatal accidents, as when attempting to descend stairs, &c.

I am aware that glasses have been made in which but half a lens has been used, the lens being cut centrally in a horizontal direction, and this so as to look over the upper edge of the lens; but that does not suffice. It does not meet the needs of those compelled to use the glasses. It still involves the removal of the glasses each time they have to look at a distance on the floor, or when about to walk, or to descend the stairs. Nor would eyeglasses which were cut so as to admit of the latter and not of the former answer a much better purpose, although of the two I much prefer the latter, as they at least admit of walking about in safety, if they do not admit of seeing with ordinary clearness at a distance. This latter style of making glasses I am not aware has ever been devised or used before, and therefore form part of my discovery; but as they are also subject to the objection before referred to I do not, in this application, lay claim to such, although I reserve to myself the right to make another application to cover the same at as early a day as practicable.

The object of my invention is, first, to remedy these objections to the various styles of glasses now in use, while retaining all their known advantages; secondly, to render them neater and less cumbersome, and at the same time capable of being made at less cost, as they may be formed, or rather cut, from much smaller pebbles, or a much greater number cut from larger ones—a feature which will readily be appreciated by the lapidary. In fact, lenses on my plan may now be cut, prepared, and finished at a cost little if any greater than the cost of ordinary glass lenses. Moreover many pieces, which would be (as in case of flaws, or because of their size) insufficient for ordinary glasses, will be amply sufficient for those cut on my plan.

My invention consists in the discovery of the fact, and its application to spectacles and eyeglasses, that lenses of but a few lines in width and length, when properly focused in the ordinary way, suffice for all practical purposes to enable the user to employ them with the same effect as glasses of the ordinary size and construction—that is to say, the lenses should be so constructed as that their focal lines shall lie along their central horizontal lines, more especially at the more central lines of their vertical axis.

For these purposes I prefer to use lenses whose central vertical axis or width is from thirty to forty-five hundredths of an inch, although they may be made slightly less than the former, or greater than the latter; but such is not deemed so advisable.

With respect to the length of the lenses in a horizontal direction, they may or not be shortened as compared with ordinary lenses; but I prefer to shorten them so as to enable the wearer to see to either side whenever he may desire so to do, without being compelled to look through them; and this may be done without detriment to the glasses, inconvenience to the wearer, or giving extra trouble to him in any way, as they will always be found in perfect readiness. For this purpose the lenses need not necessarily be longer than they are wide, although it is prefered to make them so, as it renders them much more handsome and elegant.

The particular contour of the outer edges of the lenses is not material, as they may be formed either by straight or curved lines, or any combination of such lines, so long as the general proportions with respect to their vertical width is observed.

Suitable forms, sizes, and proportions, in accordance with the principles laid down in this specification, are shown in the drawings, in which—

In each of these figures the horizontal or transverse axis or length of the lenses is about the same as that of an ordinary lens, the conjugate or vertical axis alone being changed.

Figure 3:
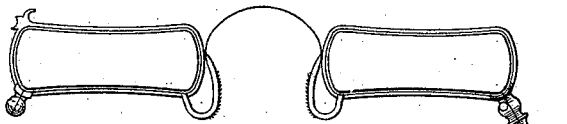

Fig. 3 represents my improved lenses as applied to a pair of eyeglasses. In this figure the lenses have the same form as those of Fig. 1.

Figure 2:
Fig. 2 represents another pair, of the same central width and length as the others, but whose form is elliptical.
Figure 4:
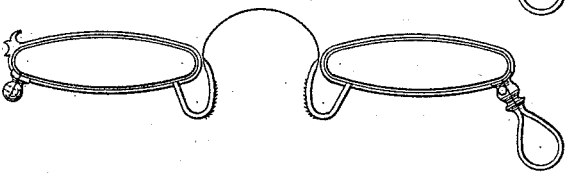
Figure 4:
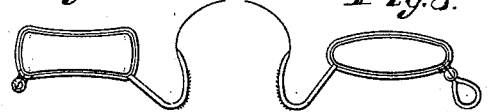
Figure 4:
Figure 4:
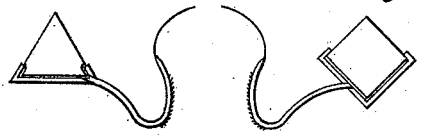

Fig. 4 represents a pair of lenses, similar to those in Fig. 2, as applied to eyeglasses.

Figure 1:
Figure 1 represents my improved lenses as applied to a pair of spectacles, in which their upper and lower edges are made slightly concave at the middle, and their ends convex.
Figure 1:

Fig. 5 represents a single lens, similar in form to those shown in Figs. 1 and 3, as applied to spectacles, it only differing from those in its width and length—i. e., in the length of its minor and major axes. This shortening of its major or transverse axis enables the wearer to see at either side, whenever he desires to do so, without requiring to look through the lenses.

Fig. 6 represents a single lens, similar in form to those shown in Figs. 2 and 4, as applied to spectacles. It differs from those figures only in the length of its minor and major axes, which in each case is shorter, and for the same reason as that explained in reference to the lens shown in Fig. 5.

Figure 7 represents a mode of applying a lens, similar to that shown in Fig. 5, to an eyeglass; and Fig. 8 a mode of applying a lens, similar to that shown in Fig. 6, to an eyeglass.

Figs. 9, 10, and 11 represent modified forms of lenses, all embodying my improvement, and ready to be mounted in suitable frames.

Fig. 12 represents another modification of my improvement, based upon a triangular system of lenses, and at the same time illustrates a suitable mode of applying it to eyeglasses.

Fig. 13 represents a similar view of still another modification, based upon a quadrangular system of lenses, and which is represented as being applied in an analogous manner to eyeglasses. Both are capable of being applied to spectacles by a suitable change—as, for instance, on the plan shown in Figs. 5 and 6.

Similar views might be shown of polygonal and other forms of lenses; but such is not deemed necessary, although held to be covered by this patent whenever they fall within the lines of my improvement.

It will be apparent that my improvement is equally applicable to lenses constructed for the use of short-sighted as for those intended for the use of long-sighted people.

Having described my invention, what I claim as new, and desire to secure by Letters Patent, is—

1. A pair of spectacles or eyeglasses, having lenses constructed in the manner and for the purposes substantially as set forth.

2. A lens for spectacles and eyeglasses, constructed in the manner and for the purposes substantially as set forth.

In testimony that I claim the foregoing as my own, I hereto affix my signature in presence of two witnesses.

P. HANNAY.

Witnesses:
D. G. STUART,
A. McCALLUM.